United States Patent
Soliman (10) Patent No.: US 11,680,213 B2
(45) Date of Patent: Jun. 20, 2023

(54) SIMULTANEOUS CRUDE OIL DEHYDRATION, DESALTING, SWEETENING, AND STABILIZATION WITH COMPRESSION

(71) Applicant: Saudi Arabian Oil Company, Dhahran (SA)

(72) Inventor: Mohamed Soliman, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 17/732,202

(22) Filed: Apr. 28, 2022

(65) Prior Publication Data

US 2022/0251459 A1    Aug. 11, 2022

Related U.S. Application Data (62) Division of application No. 17/011,861, filed on Sep. 3, 2020, now Pat. No. 11,352,574.

(51) Int. Cl.
| | |
|---|---|
| C10G 53/02 | (2006.01) |
| C10G 31/06 | (2006.01) |
| C10G 31/08 | (2006.01) |
| C10G 33/02 | (2006.01) |

(52) U.S. Cl.
CPC ............ *C10G 53/02* (2013.01); *C10G 31/06* (2013.01); *C10G 31/08* (2013.01); *C10G 33/02* (2013.01); *C10G 2300/4081* (2013.01); *C10G 2300/805* (2013.01)

(58) Field of Classification Search
CPC .............................................. B01J 2219/00006
See application file for complete search history.

(56) References Cited

U.S. PATENT DOCUMENTS

| 4,180,457 A | 12/1979 | Fotescu et al. |
| 5,114,451 A | 5/1992 | Rambo et al. |
| 8,790,509 B2 | 7/2014 | Vu |
| 9,925,476 B2 | 3/2018 | Crawford et al. |
| 10,023,811 B2 | 7/2018 | Soliman et al. |
| 10,260,010 B2 | 4/2019 | Soliman |
| 10,513,663 B2 | 12/2019 | Soliman et al. |
| 2013/0213085 A1 | 8/2013 | Ward |
| 2018/0066194 A1* | 3/2018 | Soliman ................. C10G 31/06 |
| 2018/0187095 A1* | 7/2018 | Soliman ................. B03C 11/00 |
| 2020/0080007 A1 | 3/2020 | Soliman et al. |
| 2020/0255748 A1 | 8/2020 | Soliman et al. |

FOREIGN PATENT DOCUMENTS

| CN | 106167715 A | 11/2016 |
| EP | 2497556 A1 | 6/2014 |

OTHER PUBLICATIONS

International Search Report and Written Opinion for International Application No. PCT/US2021/048959, report dated Jan. 7, 2022; pp. 1-14.

* cited by examiner

*Primary Examiner* — Randy Boyer
(74) *Attorney, Agent, or Firm* — Bracewell LLP; Constance G. Rhebergen; Eleanor L. Tyson (57) ABSTRACT

Integrated gas oil separation plant systems and methods, one system including a crude oil inlet feed stream; a low pressure production trap (LPPT); a low pressure degassing tank (LPDT); a first heat exchanger, where the first heat exchanger is fluidly disposed between the LPPT and LPDT, and is fluidly coupled to both the LPPT and LPDT, and where the first heat exchanger is operable to heat the LPDT inlet feed stream with compressed gas removed from the crude oil inlet feed stream; a first inline gas mixer preceding the LPPT to directly mix compressed gas from the LPDT into the LPPT inlet feed stream; and a LPDT recycle water stream, where the LPDT recycle water stream is operable to supply recycle water from the LPDT to the LPPT inlet feed stream.

24 Claims, 2 Drawing Sheets

SIMULTANEOUS CRUDE OIL DEHYDRATION, DESALTING, SWEETENING, AND STABILIZATION WITH COMPRESSION

CROSS-REFERENCE TO RELATED APPLICATIONS

This patent application is a divisional of U.S. Non-Provisional patent application Ser. No. 17/011,861 filed on Sep. 3, 2020. For purposes of United States patent practice, the non-provisional application is incorporated by reference in its entirety.

BACKGROUND

Field

The present disclosure relates to gas oil separation plant (GOSP) technology. In particular, the disclosure relates to integrating crude oil desalting, dehydration, sweetening, and stabilization processes to create efficient GOSP systems and processes with compression of gases used for heating to aid in separations.

Description of Related Art

In general, a GOSP is a continuous separation process used to refine crude oil that includes a high pressure production trap (HPPT), a low pressure production trap (LPPT), a low pressure degassing tank (LPDT), a dehydrator unit, first and second stage desalting units, a water/oil separation plant (WOSEP), a stabilizer column, centrifugal pumps, heat exchangers, and reboilers. In a GOSP, the pressure is often reduced in several stages to allow the controlled separation of volatile components, such as entrained vapors. Goals of a GOSP include achieving maximum liquid recovery with stabilized oil separated from gas, and water separated from gases and oil. In other words, one purpose of a GOSP is to remove water, salt, and volatile hydrocarbon gases from wet crude oil after it is obtained from a hydrocarbon-bearing reservoir.

However, a large pressure reduction in a single separator will cause flash vaporization, leading to instability and safety hazards. Thus, in prior art GOSP's, many stages and units are required, as described in U.S. Pat. Nos. 10,260,010 and 10,023,811, incorporated herein by reference in their entirety. In a first stage, gas, crude oil, and free water are separated. In a second stage, crude oil is dehydrated and desalted to separate emulsified water and salt to meet certain basic sediment and water (BSW) specifications. In a third stage, crude oil is stabilized and sweetened to meet hydrogen sulfide ($H_2S$) and Reid Vapor Pressure (RVP) specifications.

GOSP's are oftentimes operated to meet the following specifications: (1) a salt concentration of not more than about 10 pound (lbs.) of salt/1000 barrels (PTB); (2) BSW content of not more than about 0.3 volume percent (V %); (3) $H_2S$ content (concentration) of less than about 60 ppm in either the crude stabilization tower (or degassing vessels in the case of sweet crude); and (4) a maximum RVP of about 7 pounds per square inch absolute (psia) and a maximum true vapor pressure (TVP) of about 13.5 psia at 130 degrees Fahrenheit (° F.).

SUMMARY

The present disclosure describes integrated GOSP systems and processes that meet crude oil export specifications and use less processing units than prior art GOSP's. By integrating and simultaneously applying desalting, dehydration, sweetening, and stabilization processes along with gas compression and gas recycle for heating within certain pre-existing gas/oil separation vessels, advantageously and unexpectedly efficient processes and systems are obtained. Systems and methods of the present disclosure can achieve crude oil export specifications including: (1) a salt concentration of not more than about 10 PTB; (2) BSW content of not more than about 0.3 V %; (3) $H_2S$ content of less than about 60 ppm in either the crude stabilization tower (or degassing vessels in the case of sweet crude not requiring a stabilization tower); and (4) a maximum RVP of about 7 psia and a maximum TVP of about 13.5 psia at 130° F.

Embodiments of systems and methods of the disclosure provide the ability to separate and stabilize crude oils with "tight" emulsions and increased water cuts that existing GOSP systems and methods cannot separate and stabilize. In other words, conventional desalters can treat crude oils with a water cut between about 30% and about 35% by volume. However, embodiments of the present disclosure efficiently treat crude oils to remove water when the water cut is greater than about 35%. Tight emulsion crude oil normally occurs in medium to heavy crude oils with American Petroleum Institute ("API") numbers less than about 29. Oil specific gravity in the API scale is typically used as a measure of oil quality. A higher API value indicates a lighter oil and, thus, a higher market value.

Water cut in oil production refers to the total volume of water in the crude oil stream divided by the total volume of crude oil and water. In other words, water cut percent is equal to the total volumetric flowrate of water divided by the volumetric flowrate of water and oil multiplied by 100. Water cut generally increases with the age of an oil well. For example, water cut at the beginning of the life of a well is around zero percent, but as the well ages, water cut can reach close to 100%.

In certain embodiments, systems and methods are provided to treat wet and sour, unstabilized crude oil to meet shipping and transport specifications by simultaneously dehydrating, desalting, stabilizing, and sweetening the crude oil. In some embodiments, three conventional stages of processing crude oil will be done in only one stage, system, or process. In some embodiments, crude oil desalting, dehydration, sweetening, and stabilization will be integrated within existing three phase separation vessels within a GOSP along with gas compression and gas recycle for heating. Dehydrating crude oil involves the separation of formation water, while desalting includes washing the crude with fresh water in addition to or alternative to recycle water to meet the required salt content and BSW. Recycled water can be used in disclosed systems and methods to reduce the amount of fresh wash water required.

Crude sweetening involves the removal of dissolved $H_2S$ from crude oil to meet specifications in a range of about 10-60 ppmw, while crude stabilization involves the removal of light ends from crude oil, mainly $C_1$-$C_4$ hydrocarbons to reduce the TVP to less than about 13 psia at 130° F. below atmospheric pressure, or in other words no vapor will flash under atmospheric conditions, making it safe for transportation and shipment. Stabilizing the crude can be achieved if crude is heated in multiple stages of separation drums working at increasing temperatures and reduced pressure.

Embodiments disclosed here show crude oil components are separated in a series of separation vessels in which off-gases are removed from the separation vessels and compressed to heat incoming crude oil to enhance the separation, in particular focusing on systems and processes with 3-phase separation vessels including fully insulated electrostatic electrodes. In some embodiments the advantages of the systems and processes include eliminating certain existing crude oil stabilizer columns, eliminating crude oil stabilizer reboilers, eliminating crude oil charge pumps, eliminating $1^{st}$ and/or $2^{nd}$ stage desalters, and eliminating separate crude oil dehydrators. Systems and processes are compact and easily mobilized for deployment in small scale and offshore rig applications. Energy savings and efficiency are increased by separating water before heating in a HPPT.

Therefore, disclosed herein are integrated gas oil separation plant systems, one system including a crude oil inlet feed stream; a low pressure production trap (LPPT), where the LPPT is fluidly coupled to the crude oil inlet feed stream, and where the LPPT comprises an inlet mixing device operable to thoroughly mix an LPPT inlet feed stream, a plurality of insulated electrostatic electrodes, and a weir; a low pressure degassing tank (LPDT), where the LPDT is fluidly coupled to the LPPT, and where the LPDT comprises an inlet mixing device operable to thoroughly mix an LPDT inlet feed stream, a plurality of insulated electrostatic electrodes, and a weir; a first heat exchanger, where the first heat exchanger is fluidly disposed between the LPPT and LPDT, and is fluidly coupled to both the LPPT and LPDT, and where the first heat exchanger is operable to heat the LPDT inlet feed stream with compressed gas, the gas removed from the crude oil inlet feed stream; a first inline gas mixer preceding the LPPT to directly mix compressed gas removed from the LPDT into the LPPT inlet feed stream; and a LPDT recycle water stream, where the LPDT recycle water stream is operable to supply recycle water from the LPDT to the LPPT inlet feed stream.

Embodiments can include an inline gas separator preceding the LPPT to separate gas from the crude oil inlet feed stream for compression, wherein compressed gas from the inline gas separator and compressed off-gas from the LPPT is used to provide heat in the first heat exchanger. Other embodiments include a second heat exchanger, where the second heat exchanger is fluidly disposed between the LPPT and LPDT, and is fluidly coupled to both the LPPT and LPDT, and where the second heat exchanger is operable to heat the LPDT inlet feed stream with compressed gas, the gas removed from the crude oil inlet feed stream. Certain other embodiments include a first knock out drum in fluid communication with the first heat exchanger and a second knockout drum in fluid communication with the second heat exchanger, wherein after compressed gas passes through the second knockout drum the compressed gas comprises natural gas for further processing to a sales gas.

Still other embodiments include a desalter and a cold stabilizer, wherein atmospheric off-gas from the cold stabilizer is compressed and sent to the first inline gas mixer preceding the LPPT and wherein dry crude oil from the cold stabilizer is used to heat the crude oil inlet feed stream. In some embodiments, the cold stabilizer has about 16 actual stages. Still in other embodiments, the system comprises an atmospheric pressure gas compressor and a low pressure gas compressor. In some embodiments, the system comprises an atmospheric pressure gas compressor, a low pressure gas compressor, and a high pressure gas compressor, and the atmospheric pressure gas compressor compresses atmospheric off-gases from the LPDT and the cold stabilizer for supply to the first inline gas mixer, the low pressure gas compressor compresses low pressure off-gases from an inline gas separator and the LPPT for supply to the first heat exchanger, and the high pressure gas compressor compresses high pressure off-gases from the first heat exchanger for supplying heat to the second heat exchanger. Still other embodiments include a fresh wash water supply stream, where the fresh wash water supply stream is operable to supply fresh water to an output stream of the LPDT.

Other embodiments include a stripping gas stream inlet fluidly coupled with the LPDT, the stripping gas stream inlet operable to supply steam, in addition to or alternative to a low concentration $H_2S$ stripping gas, to the LPDT. Some embodiments include an oil/water separator device operable to accept an oily water output stream from the LPPT, and operable to separate oil from water. In some embodiments, the system is operable to refine crude oil in the crude oil inlet feed stream to produce a refined crude oil product safe for storage and shipment meeting the following specifications: (1) a salt concentration of not more than about 10 pound (lbs.) of salt/1000 barrels (PTB); (2) basic sediment and water (BSW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.).

Other embodiments include a high pressure production trap (HPPT), where the HPPT is fluidly coupled to the crude oil inlet feed stream and precedes the LPPT, and where the HPPT comprises an inlet mixing device operable to thoroughly mix the crude oil inlet feed stream with an additional fluid, a plurality of insulated electrostatic electrodes, and a weir. Still other embodiments include a high pressure inline gas separator preceding the HPPT to separate gas from the crude oil inlet feed stream for compression and a second inline gas mixer preceding the HPPT to directly mix compressed off-gas from the LPPT into an HPPT inlet feed stream. Still other embodiments include a LPPT recycle water stream, where the LPPT recycle water stream is operable to supply recycle water from the LPPT to be mixed with the HPPT inlet feed stream. In yet other embodiments, the system comprises an atmospheric pressure gas compressor, a low pressure gas compressor, and a high pressure gas compressor, and the atmospheric pressure gas compressor compresses atmospheric off-gases from the LPDT and from an atmospheric pressure inline gas separator preceding the LPDT to be sent to the first inline gas mixer, the low pressure gas compressor compresses low pressure off-gases from the LPPT to be sent to the second inline gas mixer, and the high pressure gas compressor compresses high pressure off-gases from the crude oil inlet feed stream and the HPPT to be sent to the first heat exchanger. Still other embodiments include a fresh wash water supply stream, where the fresh wash water supply stream is operable to supply fresh water to an output stream of the LPPT.

Some embodiments include a stripping gas stream inlet fluidly coupled with the LPDT, the stripping gas stream inlet operable to supply steam, in addition to or alternative to a low concentration $H_2S$ stripping gas, to the LPDT. Other embodiments include an oil/water separator device operable to accept an oily water output stream from the HPPT, and operable to separate oil from water. In some embodiments, the system is operable to refine crude oil in the crude oil inlet feed stream to produce a refined crude oil product safe for storage and shipment meeting the following specifications: (1) a salt concentration of not more than about 10 pound (lbs.) of salt/1000 barrels (PTB); (2) basic sediment and water (BSW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.). Some embodiments include a high pressure knockout drum to accept high pressure gas from the first heat exchanger and operable to produce a suitable natural gas for further processing to a sales gas.

Still other embodiments include at least one mixing valve preceding the HPPT, at least one mixing valve preceding the LPPT, and at least one mixing valve preceding the first heat exchanger, where the mixing valves are operable to mix crude oil and water. In some embodiments, the HPPT is operable to remove about 98% of emulsified water present in crude oil from the crude oil inlet feed stream. Still in other embodiments, operating pressure within the HPPT is greater than the operating pressure within the LPPT, and the operating pressure within the LPPT is greater than the operating pressure in the LPDT. In certain other embodiments, the system is operable to dehydrate, desalt, sweeten, and stabilize crude oil to produce crude oil safe for storage and shipment without any dehydrating or desalting units other than the HPPT, LPPT, and LPDT. Some embodiments include at least one inlet mixing device comprising a cyclonic separator.

Additionally disclosed here are methods for integrated gas oil separation, one method including: supplying a crude oil inlet feed stream; removing from the crude oil inlet feed stream a low pressure crude oil off-gas stream for compression; heating the crude oil inlet feed stream with heat provided by processed dry crude oil; mixing the crude oil inlet feed stream with compressed low pressure gas from a low pressure degassing tank (LPDT) and a cold stabilizer; initially separating the crude oil inlet feed stream in a low pressure production trap (LPPT) into a LPPT off-gas stream, the LPPT off-gas stream to be compressed with the low pressure crude oil off-gas stream, a partially-dried crude oil stream, and an oily-water stream for treatment; heating the partially-dried crude oil stream with compressed gas from the low pressure crude oil off-gas stream and the LPPT off-gas stream; further separating the partially-dried crude oil stream in the LPDT to produce a LPDT off-gas stream, a dried crude oil stream, and a recycle water stream for recycle to the crude oil inlet feed stream; desalting the dried crude oil stream to produce a dried, desalted crude oil stream and a recycle water stream for recycle to the LPDT; stabilizing the dried, desalted crude oil stream to produce a crude oil export stream, the crude oil export stream used to heat the crude oil inlet feed stream, and an atmospheric off-gas stream; and compressing the LPDT off-gas stream and the atmospheric off-gas stream for the step of mixing the crude oil inlet feed stream with compressed low pressure gas from the low pressure degassing tank (LPDT) and the cold stabilizer.

In some embodiments of the methods, the LPPT comprises an inlet mixing device operable to thoroughly mix an LPPT inlet feed stream, a plurality of insulated electrostatic electrodes, and a weir; and the LPDT comprises an inlet mixing device operable to thoroughly mix an LPDT inlet feed stream, a plurality of insulated electrostatic electrodes, and a weir. In some embodiments, the step of removing from the crude oil inlet feed stream a low pressure crude oil off-gas stream for compression includes the use of an inline gas separator preceding the LPPT. Some embodiments of the methods include the step of removing condensate from compressed off-gas using at least one knock-out drum. Still other embodiments include the step of supplying a fresh water wash stream to aid in the step of desalting.

Other embodiments include the step of supplying a stripping gas stream, the stripping gas stream to supply steam, in addition to or alternative to a low concentration $H_2S$ stripping gas. In some embodiments, the method is operable to refine crude oil in the crude oil inlet feed stream to produce a refined crude oil product safe for storage and shipment meeting the following specifications: (1) a salt concentration of not more than about 10 pound (lbs.) of salt/1000 barrels (PTB); (2) basic sediment and water (BSW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.).

Additionally disclosed is a method for integrated gas oil separation, the method comprising the steps of: supplying a crude oil inlet feed stream; removing from the crude oil inlet feed stream a high pressure crude oil off-gas stream for compression; mixing the crude oil inlet feed stream with recycle water from a low pressure production trap (LPPT); mixing the crude oil inlet feed stream with compressed high pressure gas from the LPPT; initially separating the crude oil inlet feed stream in a high pressure production trap (HPPT) into a HPPT off-gas stream, the HPPT off-gas stream to be compressed with the high pressure crude oil off-gas stream, a HPPT partially-dried crude oil stream, and an oily-water stream for treatment; mixing the HPPT partially-dried crude oil stream with recycle water from a low pressure production trap (LPDT) and with compressed atmospheric gas from the LPDT; separating the HPPT partially-dried crude oil stream in the LPPT into a LPPT off-gas stream, the LPPT off-gas stream to be compressed for mixing with the crude oil inlet feed stream, an LPPT partially-dried crude oil stream, and an oily-water recycle stream; heating the LPPT partially-dried crude oil stream with compressed gas from the high pressure crude oil off-gas stream and the HPPT off-gas stream; removing from the LPPT partially-dried crude oil stream an atmospheric pressure off-gas stream; and further separating the LPPT partially-dried crude oil stream in the LPDT to produce a LPDT off-gas stream, the LPDT off-gas stream to be compressed with the atmospheric pressure off-gas stream, a dried crude oil stream, and a recycle water stream for recycle to the LPPT.

In some embodiments, the HPPT comprises an inlet mixing device operable to thoroughly mix an HPPT inlet feed stream, a plurality of insulated electrostatic electrodes, and a weir; the LPPT comprises an inlet mixing device operable to thoroughly mix an LPPT inlet feed stream, a plurality of insulated electrostatic electrodes, and a weir; and the LPDT comprises an inlet mixing device operable to thoroughly mix an LPDT inlet feed stream, a plurality of insulated electrostatic electrodes, and a weir. Still in other embodiments, the step of removing from the crude oil inlet feed stream a high pressure crude oil off-gas stream for compression includes the use of an inline gas separator preceding the HPPT. Some embodiments include the step of removing condensate from compressed off-gas using at least one knock-out drum. Still other embodiments include the step of supplying a fresh water wash stream to aid in desalting of crude oil. Other embodiments include the step of supplying a stripping gas stream, the stripping gas stream to supply steam, in addition to or alternative to a low concentration $H_2S$ stripping gas.

Still in other embodiments, the method is operable to refine crude oil in the crude oil inlet feed stream to produce a refined crude oil product safe for storage and shipment meeting the following specifications: (1) a salt concentration of not more than about 10 pound (lbs.) of salt/1000 barrels (PTB); (2) basic sediment and water (BSW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.).

BRIEF DESCRIPTION OF THE DRAWINGS

These and other features, aspects, and advantages of the disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

While the disclosure will be described in connection with several embodiments, it will be understood that it is not intended to limit the disclosure to those embodiments. On the contrary, it is intended to cover all the alternatives, modifications, and equivalents as may be included within the spirit and scope of the disclosure defined by the appended claims.

Conventional GOSP's suffer from many deficiencies including low product yield, inefficient use of available heat sources such as for example the discharge streams of compressors, many separate units being used to meet product specifications, high operating costs due to heating requirements, a large spatial footprint, and high capital cost.

In general, a GOSP is a continuous separation system and process that includes a high pressure production trap (HPPT), a low pressure production trap (LPPT), a low pressure degassing tank (LPDT), a dehydrator unit, first and second stage desalting units, a water/oil separation plant (WOSEP), a stabilizer column, atmospheric compressors, low pressure compressors, high pressure compressors, centrifugal pumps, heat exchangers, and reboilers. In a conventional GOSP, pressure is often reduced in several stages to allow for the controlled separation of volatile components. Objectives of a GOSP include achieving maximum liquid recovery of stabilized oil and water, and gas separation. However, a large pressure reduction in a single separator will cause flash vaporization, leading to instability and safety hazards.

Prior art GOSP systems and processes generally include 3 separate stages in large-footprint plants and processes. In a first stage, gas, crude oil, and free water are separated. In a second stage, crude oil is dehydrated and desalted to separate emulsified water and salt to meet certain basic sediment and water (BSW) specifications. In a third stage, crude oil is stabilized and sweetened to meet hydrogen sulfide ($H_2S$) and Reid Vapor Pressure (RVP) specifications. Generally, sour crude oil refers to any crude oil with a total sulfur level of more than about 0.5% by weight. In upstream operations, as described herein, the phrase sour crude also refers to any crude oil with an $H_2S$ content higher than about 60 ppm by weight, and sweet crude oil refers to any crude oil that has an $H_2S$ content of less than about 60 ppm by weight.

After stabilization and sweetening, the crude oil should meet all specifications required for shipment, transport, and storage. These specifications include the following: (1) a salt concentration of not more than about 10 PTB; (2) BSW of not more than about 0.3 V %; (3) $H_2S$ content of less than about 60 ppm in the crude stabilization tower (or degassing vessels in the case of sweet crude); and (4) a maximum RVP of about 7 psia and a maximum TVP of about 13.5 psia at 130° F.

In embodiments of the present disclosure, high pressure off-gases and high pressure compressed gases are in a pressure range from about 150 psig or about 170 psig to about 460 psig, low pressure off-gases and low pressure compressed gases are in a pressure range from about 50 psig or about 70 psig to about 160 psig, and atmospheric pressure off-gases and atmospheric pressure compressed gases are in a range from about 3 psig to about 60 psig. The temperature of the off-gases depends, in part, on the source of the crude oil. For example, the initial temperature for crude oil originating from offshore oil rigs ranges between about 55° F. to about 100° F., while the temperature of crude oil originating from onshore oil fields ranges from about 100° F. to about 150° F. For example, in one embodiment the temperature of high pressure off-gas from an HPPT is about 95° F., the temperature of low pressure off-gas from a LPPT is about 95° F. (with no heater preceding the LPPT), and the temperature of the atmospheric pressure off-gas from a LPDT is about 125° F., due to a heater (heat exchanger) preceding the LPDT.

In some embodiments of the present disclosure, the operating temperatures of a HPPT and LPPT are substantially the same when no heater (heat exchanger) precedes the units. In some embodiments, the operating pressure of the HPPT is about 150 psig, the operating pressure of the LPPT is about 50 psig, and the operating pressure of the LPDT is about 3 psig. In some embodiments, the operating temperatures of the HPPT and LPPT are about 95° F., while the operating temperature of the LPDT is about 125° F.

Figure 1:
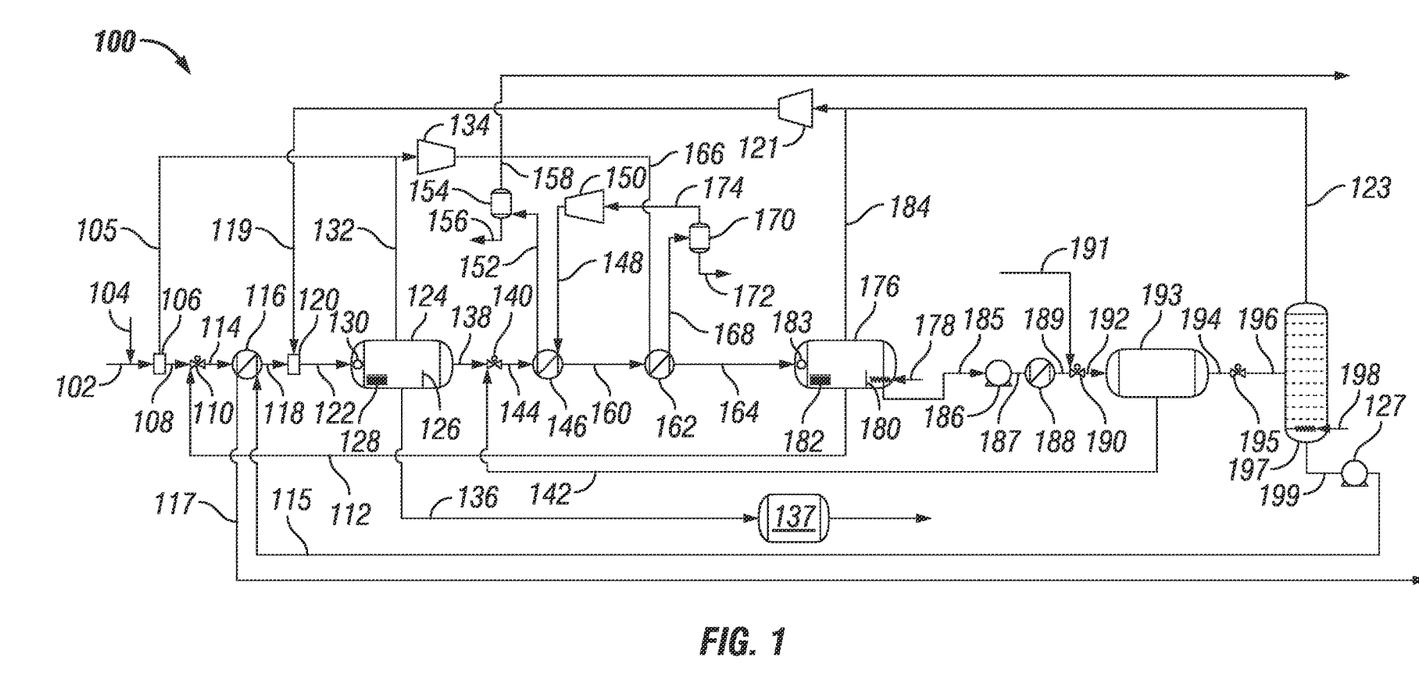
FIG. 1 is a schematic diagram showing an integrated GOSP of the present disclosure used for processing sour crude oil with integrated gas compression and gas recycle.

Referring first to FIG. 1, a schematic diagram is provided showing an integrated GOSP of the present disclosure used for processing sour crude oil with integrated gas compression and gas recycle. The direct injection of heated low pressure compressed gas following compression in an atmospheric pressure gas compressor into incoming crude oil to a LPPT will simultaneously heat the crude and cool the gas. This heated gas functions, in part, as a stripping gas in the LPPT and enables meeting an $H_2S$ crude specifications of 10 ppm using a crude oil stabilizer with 16 actual trays along with steam injection. Gas from low pressure and high pressure compressors is used in the low pressure and high pressure gas-crude heat exchangers, respectively, to heat crude oil, recover energy, and cool the gas. The representative embodiments of FIGS. 1 and 2 improve crude oil yield at the expense of condensate. In other words, heavy hydrocarbons, such as $C_{5+}$, tend to remain within the crude oil and increase the crude production while reducing condensate production. For example, in some embodiments dry, stabilized crude oil yield is improved by between about 1 thousand barrels per day (MBD) and about 5 MBD, and condensate production is decreased between about 1 MBD and about 5 MBD versus prior art systems and methods. Total heating demand can be reduced by between about 30% and about 50%. Total compression power consumption can be reduced between about 5% and about 15%.

In integrated compression GOSP system and process 100, a wet and unstabilized crude oil from oil production wells, either or both onshore or offshore, enters through inlet stream 102 and is mixed with an optional demulsifier from demulsifier inlet stream 104 to enter inline gas separator 106 which removes certain volatile off-gases from the crude oil via off-gas stream 105. Suitable inline gas separators include those provided by Caltec, United Kingdom, FMC Technologies, Houston, or ASCOM Separation. Hydrocarbon off-gases in off-gas stream 105 proceed to a low pressure gas compressor 134 for compression and heating. Mixed crude oil and optional demulsifier proceed to a mixing valve 110, which can include one or more valve or other mixing device, by stream 108, and at mixing valve 110 a recycled water stream 112 from low pressure degassing tank (LPDT) 176 is mixed into the crude oil and optional demulsifier. After mixing valve 110 the mixed stream proceeds via stream 114 to heat exchanger 116 for heating of the crude oil, recycle water, and optional demulsifier.

In embodiments disclosed here, when fresh wash water is applied in addition to or alternative to recycle wash water, a suitable volume/volume ratio for water to crude oil and hydrocarbons is between about 1 V % to about 9 V %. A lesser V/V wash water to oil and hydrocarbons is used when the salt content is less than 1,000 ppm. With greater salt content in wash water, a greater volume is used. For example, V/V for recycle water as wash water to crude oil and hydrocarbons is between about 4 V % or 5 V % to about 9 V %.

Heat exchanger 116 can include any one of or any combination of indirect heat exchangers such as shell and tube heat exchangers. The mixed stream of crude oil, recycle water, and optional demulsifier is heated by heat from dry crude oil in stream 115 from cold stabilizer 197, and cooled, dry, desalted and stabilized crude oil for shipment proceeds via stream 117. Dry crude oil for shipment in line 117 in some embodiments meets specifications including the following: (1) a salt concentration of not more than about 10 PTB; (2) BSW of not more than about 0.3 V %; (3) $H_2S$ content of less than about 60 ppm in the crude stabilization tower (or degassing vessels in the case of sweet crude); and (4) a maximum RVP of about 7 psia and a maximum TVP of about 13.5 psia at 130° F.

Heated crude oil, recycle water, and optional demulsifier next proceed via stream 118 to a direct gas mixer 120 for direct mixing of low pressure compressed and heated off-gas from stream 119 and atmospheric gas compressor 121. The low pressure compressed and heated off-gas from stream 119 and atmospheric gas compressor 121 provide further heating to the mixed stream comprising crude oil, recycle water, and optional demulsifier and the gas also acts as a stripping gas for $H_2S$. The mixed stream of off-gas, crude oil, recycle water, and optional demulsifier proceeds to a low pressure production trap (LPPT) 124, which includes a weir 126, fully-insulated electrostatic electrodes 128, and cyclonic separator 130. LPPT 124 is a horizontal three-phase separation vessel, which separates certain off-gases from the wet crude oil. Outlets from LPPT 124 include LPPT low pressure off-gas stream 132, which proceeds to low pressure gas compressor 134 for compression and heating, oily-water outlet stream 136 which proceeds via stream 136 for water treatment in oily-water treatment unit 137, and LPPT wet crude oil outlet stream 138, which proceeds to downstream processing. Operating conditions in LPPT 124 include temperature in a range from about 65° F. to about 130° F. and a pressure at about 50 psig, or between about 20 psig and 60 psig. Suitable direct gas mixers include inline nozzles such as those manufactured by ProSep of Houston, Tex.

Prior art GOSP systems also suffer from the following issues: transformer tripping and inefficient energy usage; off-specification crude oil production in terms of BSW and salt content; high operating costs required to meet the crude specifications; and inefficient human and manual operations. Certain prior art treatments are limited to treating crude oil with a low water cut (approximately 30% by volume), while water cut in certain emulsion layers can reach as high as about 85% for tight emulsions in heavy crude oil applications. Suitable insulated electrostatic electrodes are capable of handling up to 100% water cut herein without short circuiting, and this enhances the emulsion breaking capabilities of separation vessels. Limiting and treating the emulsion rag layer will avoid off-specification crude oil products and minimize demulsifier and wash water consumption. In embodiments of the disclosure, systems and methods enable the efficient control, reduction, in addition to or alternative to elimination of the rag layer. Embodiments of the disclosure can separate up to about 90% of the water content in the rag layer depending on operating temperature, crude type, electrostatic coalescers and demulsifier used, or alternatively up to about or greater than about 95% of the water content in the rag layer.

The emulsion layer can consist of water, oil, and solids. Subjecting the emulsion layer to high voltage electric fields will result in water droplets being distorted into an elliptical shape, with positive charges accumulating at the end nearest the negative electrode of the external electric field, and negative charges at the end nearest the positive electrode. The drops become induced dipoles. Two adjacent droplets in the field will have an electrical attraction for one another. The negative end of one droplet is nearest the positive end of the neighboring droplet, so there is an attractive force between the two that tends to draw them together. This force is of sufficient magnitude to rupture the interfacial film between the droplets upon collision, and allows them to coalesce into one larger droplet. The resulting larger water droplets (globules), along with water-insoluble solids, settle to the bottom of a vessel or pipe.

For purposes of the present disclosure, tight emulsion crude oil includes emulsions that occur in medium to heavy crude oils with American Petroleum Institute (API) numbers less than about 29. Crude oil specific gravity, along with API numbers, can be used as a measure of crude oil quality. Higher API values indicate lighter oils and, thus, a higher market value. Water cut in oil production refers to the total volume of water in the crude oil stream divided by the total volume of crude oil and water, or water cut percent=total volumetric flowrate of water/(volumetric flowrate of water+volumetric flowrate of crude oil)*100. Water cut increases with oil and gas well age during continuous production of oil and gas wells. Water cut at the beginning of the well life can be around zero percent and can reach close to 100% by the end of the life of the well. "Wet" crude oil normally has more than about 0.3 volume percent of water while "dry" crude has less than 0.3 volume percent water.

Insulated electrostatic electrodes can be similar to those of Wartsila Corporation of Helsinki, Finland produced under the term Vessel Internal Electrostatic Coalescers (VIEC). Another supplier of suitable electrodes would include Cameron International Corporation (a Schlumberger Company) of Houston, Tex. Emulsion separation vessel technology described in U.S. Pat. No. 10,513,663 is suitable in certain embodiments of the present disclosure and is incorporated here by reference in its entirety. Fully-insulated electrostatic electrodes 128, 182 are capable of handling up to 100% water cut, and the electrodes can be fully deactivated at about 100% water cut.

Initially-treated crude oil then proceeds via stream 138 to mixing valve 140 to be mixed with additional recycle water from stream 142 generated as the bottom stream from desalter 193. After mixing in mixing valve 140, the mixed crude oil and recycle water proceed to a heat exchanger 146 for heating via compressed high pressure gas from stream 148 and high pressure compressor 150. Heat exchanger 146 can include any one of or any combination of indirect heat exchangers such as shell and tube heat exchangers, and cooled gases proceed via stream 152 to a high pressure knockout drum 154 for separation of condensate via stream 156, to be sent for fractionation and further processing, and natural gas to be sent further processing to sales gas via stream 158. Heated initially-treated crude oil mixed with recycle water proceeds via stream 160 to heat exchanger 162 for further heating. Heat exchanger 162 can include any one of or any combination of indirect heat exchangers such as shell and tube heat exchangers, and additional heat is provided via heated and compressed gases in line 166 from low pressure gas compressor 134. Cooled gases from heat exchanger 162 proceed to low pressure knockout drum 170 for separation of condensate via stream 172 and off-gases via stream 174 for compression in high pressure compressor 150. Knockout drums are known in the art, and help separate natural gas from condensates.

After 2 stages of heating in heat exchangers 146, 162 the initially-treated crude oil mixed with recycle water from desalter 193 proceeds via stream 164 to LPDT 176, which includes a stripping gas stream 178, a weir 180, fully-insulated electrostatic electrodes 182, and cyclonic separator 183. Stripping gas stream 178 can include steam in addition to or alternative to nitrogen or other stripping gases. Stripping gas streams as described herein are optional, and can be applied as needed for removal of $H_2S$ from sour crude oil. Off-gases from LPDT 176 proceed via stream 184 to atmospheric gas compressor 121 for compression and heating. Operating conditions in LPDT 176 can include a temperature in a range from about 65° F. to about 130° F. and a pressure between about 3 psig to about 5 psig, or vacuum can be applied at LPDT 176, or the pressure can be up to about 10 psig.

LPDT-treated crude oil next proceeds via stream 185 to crude oil charge pump 186, then via stream 187 to trim heat exchanger 188 for further heating prior to proceeding via stream 189 to mixing valve 190 for mixing with fresh wash water from stream 191. LPDT-treated crude oil mixed with fresh wash water proceeds via stream 192 to desalter 193 for desalting of the crude oil. Typically, wash water salinity ranges from about 100 ppm to about 12,000 ppm salt in embodiments of the present disclosure, for example in wash water stream 191. Wash water will be more effective at lower salinity. Formation water salinity inside crude oil can reach as high as 270,000 ppm of salt content. Demulsifiers, or emulsion breakers, are chemicals used to separate emulsions (for example oil-in-water emulsions). Some commercially available demulsifiers are Petrolite DMO-22241 by Baker Petrolite, Emulsotron CC-8948 by Champion Technologies, SUGEST 9005 by German Metal Surface Treatment Chemical Co., Clariant Phasetreat 4688 by Clariant, or any other suitable demulsifier.

For example, a separation vessel operating pressure can be in the range of about 1 psig to about 10 psig, and a desalter operating pressure can be greater than about 35 psig, depending on the vapor pressure of the fluid inside the desalter. Crude oil fed to a desalter is required to be below its bubble point to ensure no free vapor is liberated in the process. Desalters are designed to be 'gas free,' since the presence of vapor in a high voltage field can cause arcing which in turn leads to more vapor formation. Desalters can operate at about 25 psig higher than the fluid vapor pressure to avoid vaporization inside the desalters and potential arcing.

Afterward, LPDT-treated, desalted crude oil proceeds via stream 194, valve 195, and stream 196 to cold stabilizer 197, which in the embodiment shown does not include reboilers. Stripping stream 198 is shown and is used as needed to remove remaining $H_2S$, and stream 198 can include steam in addition to or alternative to other stripping gases such as nitrogen. Heated sales-grade crude oil proceeds via stream 199 and pump 127 to first heat inlet crude in heat exchanger 116 before proceeding to export via stream 117. Atmospheric off-gases proceed from cold stabilizer 197 to atmospheric gas compressor 121 for compression and heating via stream 123. Notably, the system of FIG. 1 operates in the absence of a high pressure production trap, a separate dehydrator vessel, a second stage desalter, or stabilizer reboilers.

Figure 2:
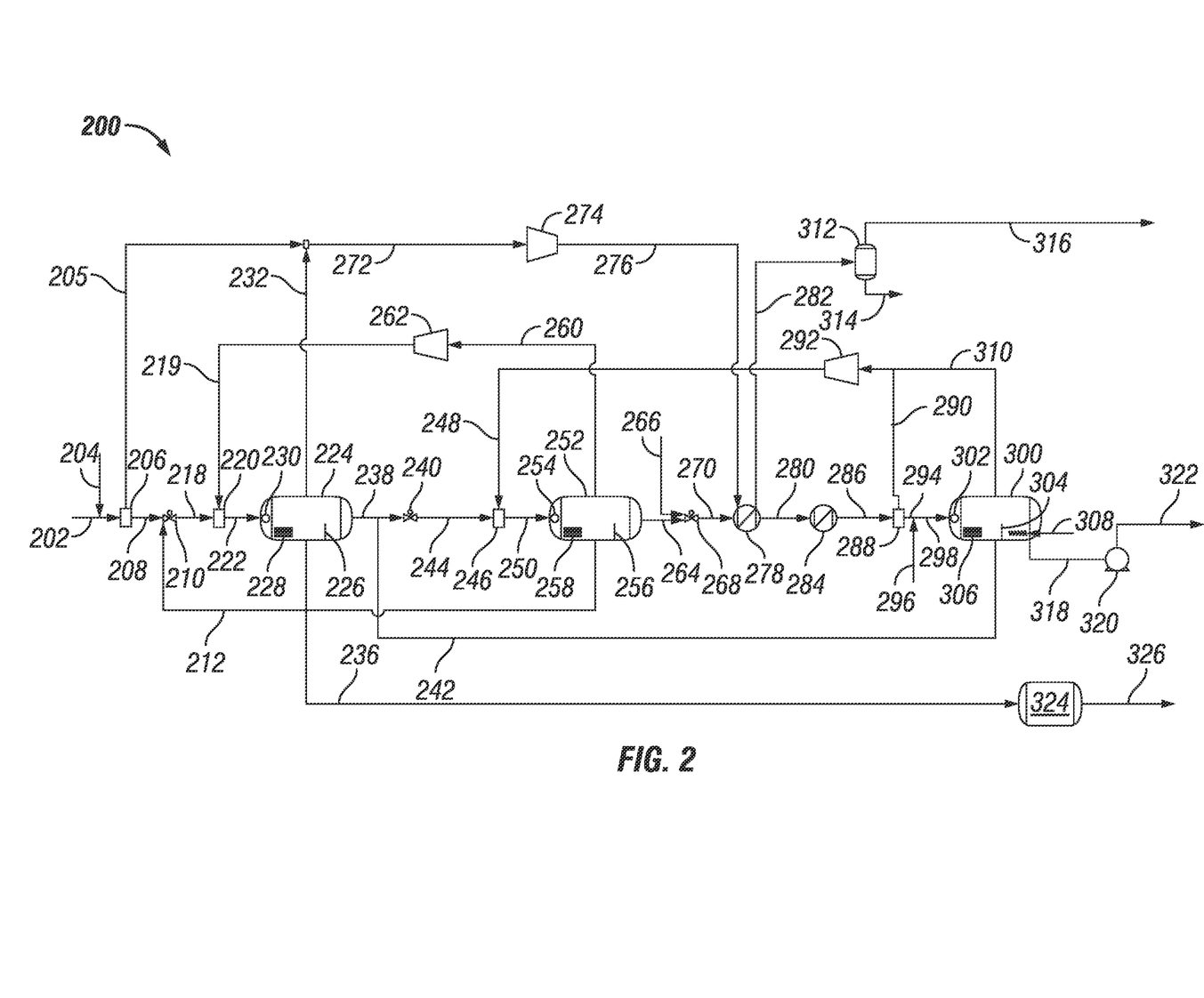
FIG. 2 is a schematic diagram showing an integrated GOSP of the present disclosure used for processing sweet or slightly sour crude oil with integrated gas compression and gas recycle.

FIG. 2 is a schematic diagram showing an integrated GOSP of the present disclosure used for processing sweet or slightly sour crude oil with integrated gas compression. Embodiments of systems and processes similar to FIG. 2 are suitable for use in situations where crude oil is sweet or contains low levels of sulfur. The direct injection of heated high pressure gas following compression in a low pressure gas compressor into incoming crude oil to a high pressure production trap (HPPT) will simultaneously heat the crude and cool the gas. This heated gas functions, in part, as a stripping gas in the HPPT and enables meeting an $H_2S$ crude specifications of 10 ppm without using a crude oil stabilizer, such as cold stabilizer 197 in FIG. 1. Gas from low pressure and high pressure compressors is used in low pressure and high pressure gas-crude heat exchangers to heat crude oil, recover energy, and cool the gas. The representative embodiments of FIGS. 1 and 2 improve crude oil yield at the expense of condensate, or in other words surprisingly and unexpectedly produce additional high quality crude for export while reducing the amount of lower value condensate produced.

In integrated compression GOSP system and process 200, a wet and unstabilized crude oil from oil production wells, either or both onshore or offshore, for example at about 63° F., or between about 40° F. and 80° F., enters through inlet stream 202 and is mixed with an optional demulsifier from demulsifier inlet stream 204 to enter inline gas separator 206 which removes certain volatile off-gases from the crude oil via off-gas stream 205. Off-gases in off-gas stream 205 proceed to a high pressure gas compressor 274 for compression and heating. Mixed crude oil and optional demulsifier proceed to a mixing valve 210 by stream 208, and at mixing valve 210 a recycled water stream from low pressure production trap (LPPT) 252 is mixed into the crude oil and optional demulsifier. After mixing valve 210 the mixed stream proceeds via stream 218 to direct gas-crude mixer 220 for heating of the crude oil, recycle water, and optional demulsifier. Heated high pressure gas is provided via stream 219 from low pressure gas compressor 262.

The high pressure compressed and heated off-gas from stream 219 and low pressure gas compressor 262 provides further heating to the mixed stream comprising crude oil, recycle water, and optional demulsifier and also acts as a stripping gas for $H_2S$, if necessary. The mixed stream of off-gas, crude oil, recycle water, and optional demulsifier proceeds to HPPT 224, which includes a weir 226, fully-insulated electrostatic electrodes 228, and cyclonic separator 230. HPPT 224 is a horizontal three-phase separation vessel, which separates certain off-gases from the wet crude oil. Outlets from HPPT 224 include HPPT high pressure off-gas stream 232, which proceeds to high pressure gas compressor 274 for compression and heating, oily-water outlet stream 236 which proceeds via stream 236 for water treatment in oily-water treatment unit 324, and HPPT wet crude oil outlet stream 238, which proceeds to downstream processing. Operating conditions in the HPPT include temperature in a range from about 65° F. to about 130° F., and pressure at about 150 pounds per square inch gauge (psig), or between about 100 psig and about 450 psig. After treatment, any remaining oily-water waste can proceed to waste disposal wells via stream 326.

Initially-treated crude oil then proceeds via stream 238 to mixing valve 240 to be mixed with additional recycle water from stream 242 generated as the bottom stream from LPDT 300. After mixing in mixing valve 240, the mixed crude oil and recycle water proceed to a direct gas-crude mixer 246 for heating via compressed high pressure gas from stream 248 and atmospheric pressure gas compressor 292. LPPT 252 includes a cyclonic separator 254, a weir 256, and fully-insulated electrostatic electrodes 258. In the embodiment shown, the inlet temperature of the mixed stream to LPPT 252 can be about 140° F., or between about 100° F. and 150° F. In LPPT 252 off-gas is separated via stream 260 and proceeds to low pressure gas compressor 262, recycle water is separated via stream 212, and LPPT-treated crude oil proceeds via stream 264 to mixing valve 268 for mixing with wash water from stream 266. Operating conditions in LPPT 252 include temperature in a range from about 65° F. to about 130° F. and a pressure at about 50 psig, or between about 20 psig and 60 psig.

Mixed wash water and crude oil proceed from mixing valve 268 via stream 270 to heat exchanger 278 for heating by hot high pressure compressed gas from stream 276 and high pressure gas compressor 274. Heat exchanger 278 can include any one of or any combination of indirect heat exchangers such as shell and tube heat exchangers, and cooled gases proceed via line 282 to a high pressure knock-out drum 312 for separation of condensate via line 314, to be sent for further processing and fractionation, and natural gas to be sent for further processing to sales gas via line 316. Heated LPPT-treated crude oil mixed with wash water proceeds via stream 280 to trim heat exchanger 284 for further heating. Trim heat exchanger 284 can include any one of or any combination of indirect heat exchangers such as shell and tube heat exchangers or an electric heater. LPPT-treated crude oil mixed with wash water, in some embodiments heated to about 180° F., or between about 150° F. and 200° F., proceeds via stream 286 to inline gas separator 288 for separation of off-gases at about atmospheric pressure via stream 290 to atmospheric pressure gas compressor 292.

Partially de-gassed crude oil mixed with wash water proceeds via stream 294, and optional stripping gas in addition to or alternative to steam can be provided at stream 296 before LPDT 300. LPDT 300 includes cyclonic separator 302, weir 304, and fully-insulated electrostatic electrodes 306. Optional stripping gas in addition to or alternative to steam can be applied to LPDT 300 via stream 308. Operating conditions in LPDT 300 can include a temperature in a range from about 65° F. to about 130° F. and a pressure between about 3 psig to about 5 psig, or vacuum can be applied at LPDT 300, or the pressure can be up to about 10 psig. Dry, stabilized crude for export, and any remaining natural gas for further processing, proceed via stream 318 to crude oil pump 320 and stream 322. Notably, the system of FIG. 2 does not include separate desalting units, separate dehydrating units, a stabilizer, or reboilers.

Typically, wash water salinity ranges from about 100 ppm to about 12,000 ppm salt in embodiments of the present disclosure, for example in wash water stream 266. Wash water will be more effective at lower salinity. Formation water salinity inside crude oil can reach as high as 270,000 ppm of salt content. Demulsifiers, or emulsion breakers, are chemicals used to separate emulsions (for example oil-in-water emulsions). Some commercially available demulsifiers are Petrolite DMO-22241 by Baker Petrolite, Emulsotron CC-8948 by Champion Technologies, SUGEST 9005 by German Metal Surface Treatment Chemical Co., Clariant Phasetreat 4688 by Clariant, or any other suitable demulsifier.

In some embodiments of FIG. 2, a pressure drop in HPPT 224 causes lighter hydrocarbon gases in the crude oil to separate from the heavier liquid hydrocarbons. The plurality of fully-insulated electrostatic electrodes 228 simultaneously dehydrates crude oil and removes emulsified water, for example up to 98% of emulsified water. The operating pressure of LPPT 252 is less than HPPT 224, and LPPT 252 removes any remaining off-gas and emulsified water. LPPT 252 is a horizontal three-phase separation vessel. Operating pressure of LPPT 252 in some embodiments is about ⅓ of HPPT 224 operating pressure in order to maximize separated liquid recovery.

Partially dry crude oil in stream 264 following LPPT 252 still contains light components or impurities that need to be further reduced. These impurities can include $H_2S$, $N_2$, $CO_2$, $CH_4$, $C_2H_4$, $C_3H_6$, water, or any other suspended solids or light gases. Stream 264 is mixed with wash water from stream 266 in mixing valve 268, or any other suitable mixers, to disperse the water into small fine droplets to reduce the salt content or any other impurities in the crude oil. Low salinity wash water rinses the remaining salt from the crude oil. Fresh wash water can be used in the desalting processes to ensure that the maximum amount of salt is rinsed from the crude oil. Injecting low salinity water before heat exchangers aids in minimizing fouling.

Heating crude makes it easier to separate out gas and enhance the desalting efficiency in LPDT 300. Electrostatic coalescence removes the remaining water emulsion from the crude oil eliminating the need for 2nd stage desalters in certain prior art systems and processes. Heated crude oil enters LPDT 300, which operates at a lower pressure than LPPT 252, and LPDT 300 finally removes remaining gas impurities from the crude oil to meet the RVP/$H_2S$ content specifications. Dry crude oil for shipment in stream 322 in some embodiments meets specifications including the following: (1) a salt concentration of not more than about 10 PTB; (2) BSW of not more than about 0.3 V %; (3) $H_2S$ content of less than about 60 ppm in the crude stabilization tower (or degassing vessels in the case of sweet crude); and (4) a maximum RVP of about 7 psia and a maximum TVP of about 13.5 psia at 130° F.

Wet crude oil generally contains some free salty water, and salty water in the form of an emulsion. The emulsion is separated into layers of oil and water by electrostatic coalescence. Electrostatic coalescence applies an electric current, causing water droplets in an emulsion to collide, coalesce into larger (heavier) drops, and settle out of the crude oil as separate liquid water. This process partially dries wet crude oil.

Stabilization is a process carried out using heating to remove any remaining dissolved gases, light, volatile hydrocarbons, and $H_2S$. Crude oil is hence split into two components: atmospheric gas from the overhead, for example at stream 123, and stabilized, sweetened crude oil from the bottoms, for example at cold stabilizer product bottom stream 199. Stabilizing crude oil is achieved when crude oil is heated in a multiple stages of separation drums working at increasing temperatures and reduced pressure.

Cold stabilizer 197 performs two functions simultaneously by sweetening sour crude oil by removing the hydrogen sulfide, and reducing the vapor pressure through removal of light, volatile hydrocarbons, thereby making the crude oil safe for shipment in pipelines. Stabilization involves the removal of light ends from crude oil, mainly $C_1$-$C_4$ hydrocarbons, to reduce the vapor pressure to produce dead or stable product that can be stored in an atmospheric tank. Stabilization aims to lower vapor pressure of crude oil to a maximum RVP of about 7 psia and a maximum TVP of about 13.5 psia at 130° F., or in other words low enough so no vapor will flash under atmospheric conditions, making it safe for transportation and shipment. Operating conditions of a stabilizer, such as for example cold stabilizer 197, include temperature in a range from about 160° F. to about 200° F. and pressure from about 3 psig to about 5 psig.

Higher LPPT and HPPT operating temperatures also aid in crude sweetening and stabilization, for example in cold stabilizer 197. In some embodiments, integrated compression GOSP systems and processes 100 and 200 can be used to process light crude or extra light crude grades. For example, in some applications in Saudi Arabia, crude oil grade is measured by the American Petroleum Institute (API) range as follows: Arabian Super Light (49-52 API); Arabian Extra Light (37-41 API); and Arabian Light (32-36 API). API=141.5/(crude oil specific gravity)−131.5.

For the systems of FIGS. 1 and 2, flow loop tests were performed to verify the applicability of the internal electrostatic electrodes and effectiveness inside the three-phase separators, such as HPPT's, LPPT's, and LPDT's.

Wet crude oil as used in the specification generally refers to crude oil having more than about 0.3 volume percent of water, while dry crude oil has less than about 0.3 volume percent of water. The phrase lighter hydrocarbons as used throughout the specification refers generally to $C_{1-4}$ components such as, for example, methane, ethane, propane, butane, iso-butane, and trace amounts of $C_{5+}$ compounds. The phrase heavier hydrocarbons as used in the specification refers generally to $C_{5+}$ or five-carbon and greater hydrocarbons such as, for example, pentane, ispentane, hexane, and heptane. Heavier hydrocarbons can have trace amounts of lighter hydrocarbons.

HPPT high pressure off-gas stream 232, in some embodiments, ranges from between about 150 psig to about 450 psig, depending on the crude oil supply pressure. HPPT high pressure off-gas stream 232 can include lighter hydrocarbons, traces of $C_{5+}$ hydrocarbons, $H_2S$, $CO_2$, $N_2$, and water vapor; however, the relative amounts and types of compounds will depend on the crude oil inlet feed stream.

LPPT low pressure off-gas stream 260 ranges from between about 50 psig to about 90 psig. LPPT low pressure off-gas stream 260 can include lighter hydrocarbons, traces of $C_{5+}$ hydrocarbons, $H_2S$, $CO_2$, $N_2$, and water vapor; however, the relative amounts and types of compounds will depend on the crude oil inlet feed stream.

In some embodiments of LPDT 300, pressure is reduced to about 3 psig, so that any remaining heavy gas components can boil off. Heavy gas components in the case of LPDT 300 can include propane, butane, iso-butane, $H_2S$, $CO_2$, and $C_{5+}$ hydrocarbons; however, the relative amounts and types of compounds will depend on the crude oil inlet feed stream.

Operating conditions of a desalter such as desalter 193 can include a temperature range from about 130° F. to about 160° F. and a pressure at about 25 psig above the crude vapor pressure.

Second stage desalters are not required in embodiments of the present disclosure. Sweetening involves the removal of dissolved $H_2S$ gas from crude oil to meet specifications in a range of about 10-60 ppm $H_2S$. Sweetening is performed to reduce corrosion to pipelines and eliminate health and safety hazards associated with $H_2S$. Steam can be used to strip $H_2S$ gas from crude oil in addition to or alternative to any other suitable stripping gas that is low in $H_2S$ concentration relative to the crude oil. Suitable stripping gas streams include natural gas low in $H_2S$ concentration (such as methane and ethane), steam, and nitrogen ($N_2$).

Stabilization operates by heating unstabilized crude oil containing dissolved gases and $H_2S$, and splitting it into two components: gas from an overhead stream and crude oil from a bottoms stream. Stabilizing crude oil can be achieved if crude oil is heated in multiple stages of separation drums working at increasing temperatures and reduced pressure, such as for example in cold stabilizer 197. Oil stabilization units perform two functions at the same time, which include sweetening sour crude oil by removing hydrogen sulfide and reducing vapor pressure, thereby making the crude safe for shipment in pipelines.

Stabilization involves the removal of light ends, mainly $C_1$-$C_4$ hydrocarbons, from crude oil, to reduce the vapor pressure to produce a less volatile and stable product that can be stored in an atmospheric tank. Stabilization also aims to lower vapor pressure of crude oil to at least about 13 psia below atmospheric pressure, so no vapor will flash under atmospheric conditions, making it safe for transportation and shipment. The operating temperature of the cold stabilizer 197 ranges from about 160° F. to about 200° F., and the pressure ranges from about 3 to about 5 psig.

Cold stabilizer 197 has a number of trays (for example, up to about sixteen), whereby crude oil flows down over each tray until it reaches a draw-off tray.

The systems and processes represented by FIG. 2 advantageously allow for eliminating a crude oil stabilizer, such as for example cold stabilizer 197, eliminating crude stabilizer reboilers, such as for example thermosiphon reboilers, eliminating certain crude charge pumps, such as for example crude oil charge pump 186, and eliminating a first stage desalter, such as for example desalter 193. Further benefits include integrated GOSP systems and methods being compact, efficient, and easily mobilized, transportable, and deployable in small-scale and offshore applications. Embodiments of the present disclosure reduce the need for units in land-based onshore applications, while also reducing costs of operation.

For certain embodiments of disclosed systems and methods, for example those of FIGS. 1 and 2, suitable approximate operating temperature and pressure ranges for units, inlets, and outlets are shown in Tables 1, 2, and 3 below.

TABLE 1

Suitable temperature and pressure ranges for certain units described.

| Vessel | Temperature, °F. | Pressure, psig |
|---|---|---|
| Inline Cyclonic Separator | 50-60 | 145-200 |
| HPPT | 80-100 | 135-165 |
| LPPT | 100-140 | 35-60 |
| LPDT | 100-150 | 3-15 |
| Dehydrator | 120-180 | 90-200 |
| Desalter | 120-180 | 90-200 |
| Stabilizer | 120-220 | 3-15 |
| Atm Comp Suction KOD | 100-150 | 3-15 |
| Atm Comp Discharge KOD | 210-290 | 45-80 |
| LP Comp Suction KOD | 100-150 | 35-70 |
| LP Comp Discharge KOD | 210-290 | 145-180 |
| HP Comp Suction KOD | 100-150 | 135-170 |
| HP Comp Discharge KOD | 210-290 | 420-500 |

TABLE 2

Suitable temperature and pressure ranges for certain units described.

| | Inlet | | Outlet | |
|---|---|---|---|---|
| Unit | Temp, °F. | Press, psig | Temp, °F. | Press, psig |
| Atm Compressor | 100-150 | 3-15 | 210-290 | 45-80 |
| LP Compressor | 100-150 | 35-70 | 210-290 | 145-180 |
| HP Compressor | 100-150 | 135-170 | 210-290 | 420-500 |

TABLE 3

Suitable temperature and pressure ranges for certain units described.

| | Wet Crude Temperature, °F. | |
|---|---|---|
| Unit | Inlet | Outlet |
| 1st Heat Exchanger | 50-90 | 60-110 |
| 2nd Heat Exchanger | 60-110 | 120-130 |
| Trim Heater | 120-130 | 150-180 |

Demulsifiers enhance desalting processes and allow treatment of "tight" emulsions. Also referred to as emulsion breakers, demulsifiers are chemicals used to separate emulsions such as, for example, water in oil. For example, one such demulsifier is PHASETREAT® by Clariant of Muttenz, Switzerland.

The composition of high pressure off-gases, low pressure off-gases, and atmospheric pressure off-gases will vary depending on the temperature and pressure of an HPPT, LPPT, and LPDT. Moreover, the composition of high pressure off-gases, low pressure off-gases, and atmospheric pressure off-gases will depend on the inlet temperature, pressure, and composition of crude oil. A low pressure off-gas will have higher molecular weight compounds than a high pressure off-gas, and an atmospheric pressure off-gas will have higher molecular weight compounds than a low pressure off-gas. In some embodiments, a high pressure compressor accepts high pressure off-gas at about 150 psig and compresses the high pressure off-gas to about 450 psig; a low pressure compressor accepts low pressure off-gas at about 50 psig and compresses the low pressure off-gas to about 160 psig; and an atmospheric pressure compressor accepts atmospheric pressure off-gas at about 0.7 psig and compresses the atmospheric pressure off-gas to about 60 psig.

Efficient inlet mixing devices and cyclonic separators improve the separation of gas and liquid in vessels such as an HPPT, LPPT, and LPDT, and thus the size of vessels including HPPT's, LPPT's, and LPDT's can be reduced in embodiments of the present invention.

Inline gas separators include compact gas/liquid separators that apply cyclonic separation techniques to generate high gravitational forces ("G-Forces") with a low pressure drop to achieve high separation performance of gas from liquid in a pipe spool. Inline separators can be considered as one equilibrium separation stage, and produce very high quality separate gas and liquid streams.

Additional benefits of the systems and processes described here include eliminating crude stabilizer columns and reboilers, eliminating crude charge pumps, eliminating $1^{st}$ and/or $2^{nd}$ stage desalters, eliminating crude dehydrator units, and compacting multiple stage GOSP's into a single, mobile GOSP unit.

Although the disclosure has been described with respect to certain features, it should be understood that the features and embodiments of the features can be combined with other features and embodiments of those features.

Although the disclosure has been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a," "an," and "the" include plural referents, unless the context clearly dictates otherwise. The term "about" in some embodiments includes values 5% above or below the value or range of values provided.

As used throughout the disclosure and in the appended claims, the words "comprise," "has," and "include" and all grammatical variations thereof are each intended to have an open, non-limiting meaning that does not exclude additional elements or steps.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

While the disclosure has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present disclosure may suitably comprise, consist or consist essentially of the elements disclosed and may be practiced in the absence of an element not disclosed.

What is claimed is:

1. An integrated gas oil separation plant system, the system comprising:
   a crude oil inlet feed stream;
   a low pressure production trap (LPPT), where the LPPT is fluidly coupled to the crude oil inlet feed stream, and where the LPPT comprises an inlet mixing device operable to thoroughly mix an LPPT inlet feed stream, a plurality of insulated electrostatic electrodes, and a weir;
a low pressure degassing tank (LPDT), where the LPDT is fluidly coupled to the LPPT, and where the LPDT comprises an inlet mixing device operable to thoroughly mix an LPDT inlet feed stream, a plurality of insulated electrostatic electrodes, and a weir;
a first heat exchanger, where the first heat exchanger is fluidly disposed between the LPPT and LPDT, and is fluidly coupled to both the LPPT and LPDT, and where the first heat exchanger is operable to heat the LPDT inlet feed stream with compressed gas, gas removed from the crude oil inlet feed stream;
a second heat exchanger, where the second heat exchanger is fluidly disposed between the LPPT and LPDT, and is fluidly coupled to both the LPPT and LPDT, and where the second heat exchanger is operable to heat the LPDT inlet feed stream with compressed gas, the gas removed from the crude oil inlet feed stream;
a first knock out drum in fluid communication with the first heat exchanger and a second knockout drum in fluid communication with the second heat exchanger, wherein after compressed gas passes through the second knockout drum the compressed gas comprises natural gas for further processing to a sales gas;
a first inline gas mixer preceding the LPPT to directly mix compressed gas removed from the LPDT into the LPPT inlet feed stream; and
a LPDT recycle water stream, where the LPDT recycle water stream is operable to supply recycle water from the LPDT to the LPPT inlet feed stream.

2. The system according to claim 1, further comprising an inline gas separator preceding the LPPT to separate gas from the crude oil inlet feed stream for compression, and wherein compressed gas from the inline gas separator and compressed off-gas from the LPPT is used to provide heat in the first heat exchanger.

3. The system according to claim 1, further comprising a desalter and a cold stabilizer, wherein atmospheric off-gas from the cold stabilizer is compressed and sent to the first inline gas mixer preceding the LPPT and wherein dry crude oil from the cold stabilizer is used to heat the crude oil inlet feed stream.

4. The system according to claim 3, wherein the cold stabilizer has about 16 actual stages.

5. The system according to claim 1, wherein the system comprises an atmospheric pressure gas compressor and a low pressure gas compressor.

6. The system according to claim 1, wherein the system comprises an atmospheric pressure gas compressor, a low pressure gas compressor, and a high pressure gas compressor, and wherein the atmospheric pressure gas compressor compresses atmospheric off-gases from the LPDT and a cold stabilizer for supply to the first inline gas mixer, the low pressure gas compressor compresses low pressure off-gases from an inline gas separator and the LPPT for supply to the first heat exchanger, and the high pressure gas compressor compresses high pressure off-gases from the first heat exchanger for supplying heat to the second heat exchanger.

7. The system according to claim 1, further comprising a fresh wash water supply stream, where the fresh wash water supply stream is operable to supply fresh water to an output stream of the LPDT.

8. The system according to claim 1, further comprising a stripping gas stream inlet fluidly coupled with the LPDT, the stripping gas stream inlet operable to supply steam, in addition to or alternative to a low concentration $H_2S$ stripping gas, to the LPDT.

9. The system according to claim 1, further comprising an oil/water separator device operable to accept an oily water output stream from the LPPT, and operable to separate oil from water.

10. The system according to claim 1, where the system is operable to refine crude oil in the crude oil inlet feed stream to produce a refined crude oil product safe for storage and shipment meeting the following specifications: (1) a salt concentration of not more than about 10 pound (lbs.) of salt/1000 barrels (PTB); (2) basic sediment and water (BSW) of not more than about 0.3 volume percent (V %); (3) $H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.).

11. The system according to claim 1, further comprising a high pressure production trap (HPPT), where the HPPT is fluidly coupled to the crude oil inlet feed stream and precedes the LPPT, and where the HPPT comprises an inlet mixing device operable to thoroughly mix the crude oil inlet feed stream with an additional fluid, a plurality of insulated electrostatic electrodes, and a weir.

12. The system according to claim 11, further comprising a high pressure inline gas separator preceding the HPPT to separate gas from the crude oil inlet feed stream for compression and a second inline gas mixer preceding the HPPT to directly mix compressed off-gas from the LPPT into an HPPT inlet feed stream.

13. The system according to claim 12, further comprising a LPPT recycle water stream, where the LPPT recycle water stream is operable to supply recycle water from the LPPT to be mixed with the HPPT inlet feed stream.

14. The system according to claim 11, wherein the system comprises an atmospheric pressure gas compressor, a low pressure gas compressor, and a high pressure gas compressor, and wherein the atmospheric pressure gas compressor compresses atmospheric off-gases from the LPDT and from an atmospheric pressure inline gas separator preceding the LPDT to be sent to the first inline gas mixer, the low pressure gas compressor compresses low pressure off-gases from the LPPT to be sent to the second inline gas mixer, and the high pressure gas compressor compresses high pressure off-gases from the crude oil inlet feed stream and the HPPT to be sent to the first heat exchanger.

15. The system according to claim 11, further comprising a fresh wash water supply stream, where the fresh wash water supply stream is operable to supply fresh water to an output stream of the LPPT.

16. The system according to claim 11, further comprising a stripping gas stream inlet fluidly coupled with the LPDT, the stripping gas stream inlet operable to supply steam, in addition to or alternative to a low concentration $H_2S$ stripping gas, to the LPDT.

17. The system according to claim 11, further comprising an oil/water separator device operable to accept an oily water output stream from the HPPT, and operable to separate oil from water.

18. The system according to claim 11, where the system is operable to refine crude oil in the crude oil inlet feed stream to produce a refined crude oil product safe for storage and shipment meeting the following specifications: (1) a salt concentration of not more than about 10 pound (lbs.) of salt/1000 barrels (PTB); (2) basic sediment and water (BSW) of not more than about 0.3 volume percent (V %); (3)

$H_2S$ concentration of less than about 60 ppm; and (4) a maximum RVP of about 7 pounds per square inch absolute (psia) and a maximum true vapor pressure (TVP) of about 13.5 psia at 130 degrees Fahrenheit (° F.).

19. The system according to claim 14, further comprising a high pressure knockout drum to accept high pressure gas from the first heat exchanger and operable to produce a suitable natural gas for further processing to a sales gas.

20. The system according to claim 11, further comprising at least one mixing valve preceding the HPPT, at least one mixing valve preceding the LPPT, and at least one mixing valve preceding the first heat exchanger, where the mixing valves are operable to mix crude oil and water.

21. The system according to claim 11, wherein the HPPT is operable to remove about 98% of emulsified water present in crude oil from the crude oil inlet feed stream.

22. The system according to claim 11, wherein operating pressure within the HPPT is greater than the operating pressure within the LPPT, and where the operating pressure within the LPPT is greater than the operating pressure in the LPDT.

23. The system according to claim 11, wherein the system is operable to dehydrate, desalt, sweeten, and stabilize crude oil to produce crude oil safe for storage and shipment without any dehydrating or desalting units other than the HPPT, LPPT, and LPDT.

24. The system according to claim 1, wherein at least one of the inlet mixing devices comprises a cyclonic separator.

* * * * *